United States Patent [19]

Coates

[11] Patent Number: 4,558,847

[45] Date of Patent: Dec. 17, 1985

[54] PATIENT LIFTING TABLE

[75] Inventor: Simon T. E. Coates, Redbank Plains, Australia

[73] Assignee: Coates Management Pty. Ltd., Redbank Plains, Australia

[21] Appl. No.: 465,580

[22] Filed: Feb. 10, 1983

Related U.S. Application Data

[63] Continuation-in-part of Ser. No. 313,086, Oct. 20, 1981, abandoned.

[30] Foreign Application Priority Data

Oct. 22, 1980 [AU] Australia .............................. PE6168

[51] Int. Cl.⁴ .................................................. B60P 1/48

[52] U.S. Cl. ...................................... 254/9 C; 254/122

[58] Field of Search ............... 254/9 R, 9 B, 9 C, 122; 182/40, 141, 158, 63, 69; 187/18; 5/63; 119/103

[56] References Cited

U.S. PATENT DOCUMENTS

| | | | |
|---|---|---|---|
| 214,224 | 4/1879 | Winters | 182/69 |
| 366,365 | 7/1887 | Averberg | 187/18 |
| 682,932 | 9/1901 | Haltom | 254/122 |
| 1,190,034 | 7/1916 | Starcovic | 182/69 |
| 2,043,887 | 6/1936 | Dement . | |
| 2,370,887 | 3/1945 | Saskin | 182/63 |
| 2,489,056 | 11/1949 | Stewart | 254/9 B |
| 2,501,001 | 3/1950 | Neely . | |
| 2,862,689 | 12/1958 | Dalrymple et al. . | |
| 2,899,172 | 8/1959 | Cresci . | |
| 2,928,558 | 3/1960 | Bamford et al. . | |
| 2,937,003 | 5/1960 | Croll . | |
| 3,032,319 | 5/1962 | Dale . | |
| 3,110,476 | 11/1963 | Farris | 187/18 |
| 3,203,670 | 3/1965 | Farris . | |
| 3,208,432 | 9/1965 | Fisk . | |
| 3,228,659 | 1/1966 | Sturm . | |
| 3,237,921 | 3/1966 | Jay . | |
| 3,246,876 | 4/1966 | Larson . | |
| 3,282,566 | 11/1966 | Clarke . | |
| 3,282,566 | 11/1966 | Clarke . | |
| 3,308,485 | 3/1967 | Nesbit-Evans | |
| 3,308,790 | 3/1967 | Crowson . | |
| 3,380,085 | 4/1968 | Ferneau et al. . | |
| 3,476,016 | 11/1969 | Dixon et al. | 187/18 |
| 3,621,940 | 11/1971 | Lodige | 182/141 |
| 3,623,707 | 11/1971 | Klapp . | |
| 3,686,696 | 8/1972 | Lanigan . | |
| 4,073,240 | 2/1978 | Fly . | |
| 4,097,941 | 7/1978 | Merkel . | |
| 4,148,280 | 4/1979 | Masuda et al. . | |
| 4,221,280 | 9/1980 | Richards . | |
| 4,457,403 | 7/1984 | Ream | 254/122 |

FOREIGN PATENT DOCUMENTS

| | | | |
|---|---|---|---|
| 1106942 | 5/1961 | Fed. Rep. of Germany | 254/122 |
| 1136473 | 9/1962 | Fed. Rep. of Germany . | |
| 1554034 | 1/1970 | Fed. Rep. of Germany . | |
| 1566467 | 12/1970 | Fed. Rep. of Germany . | |
| 2253765 | 8/1973 | Fed. Rep. of Germany . | |
| 1256920 | 2/1961 | France | 254/122 |
| 2252835 | 6/1975 | France . | |
| 523334 | of 0000 | United Kingdom . | |
| 2055753 | 3/1981 | United Kingdom . | |

*Primary Examiner*—Robert C. Watson
*Attorney, Agent, or Firm*—Litman, Day and McMahon

[57] ABSTRACT

A patient lifting table includes upper and lower platforms with a connecting scissors linkage mechanism providing straight upward and downward movement of the upper platform. The scissors linkage mechanism has first and second link arms pivotally connected at intermediate portions and which form an X when extended. The lower end of one of the link members has a bell crank arm extending therefrom and situated on the underside of the lower platform. An extensible and retractible ram is also mounted generally below the lower platform and is pivotally connected to the bell crank arm whereby operation of the ram causes the link members to swing relative to each other and cause the upper platform to raise and lower. All of the ram and bell crank assembly is mounted below the generally planar, obstruction free upper surface of the lower platform for ease of cleaning, thereby making the lifting table particularly suited for hospital and veterinary operations.

6 Claims, 14 Drawing Figures

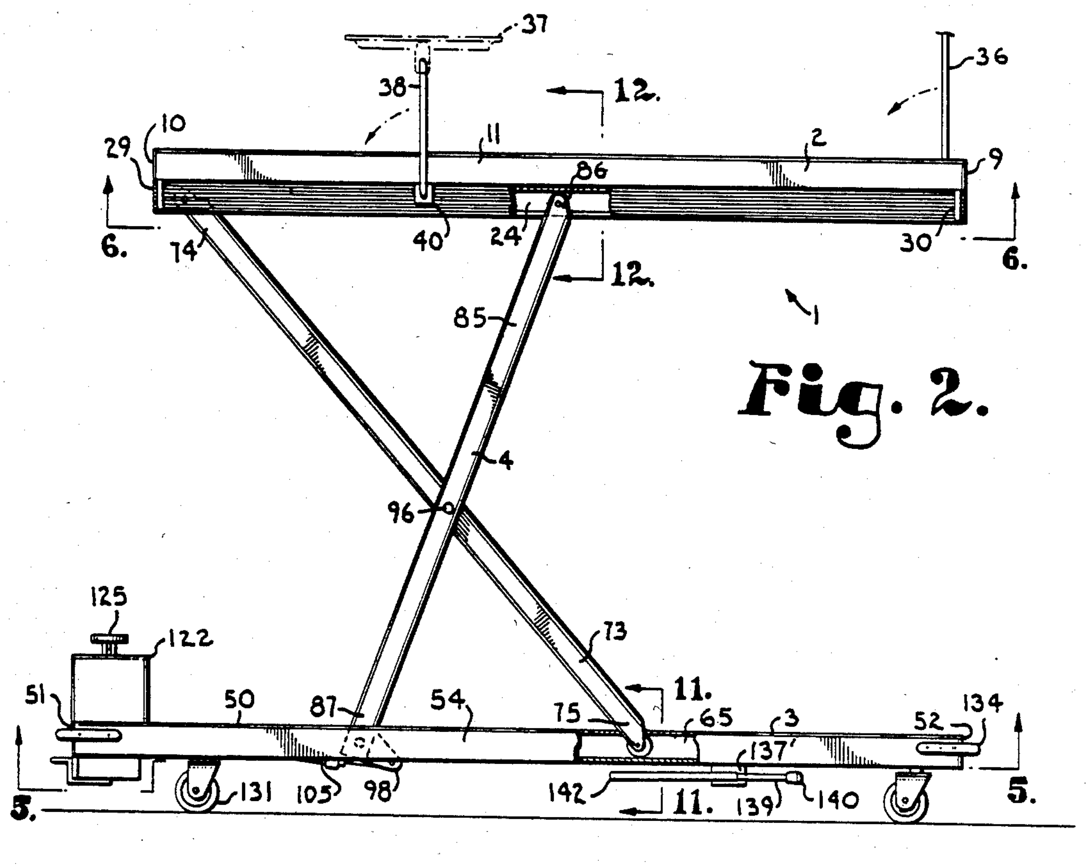
Fig. 2.
Fig. 3.
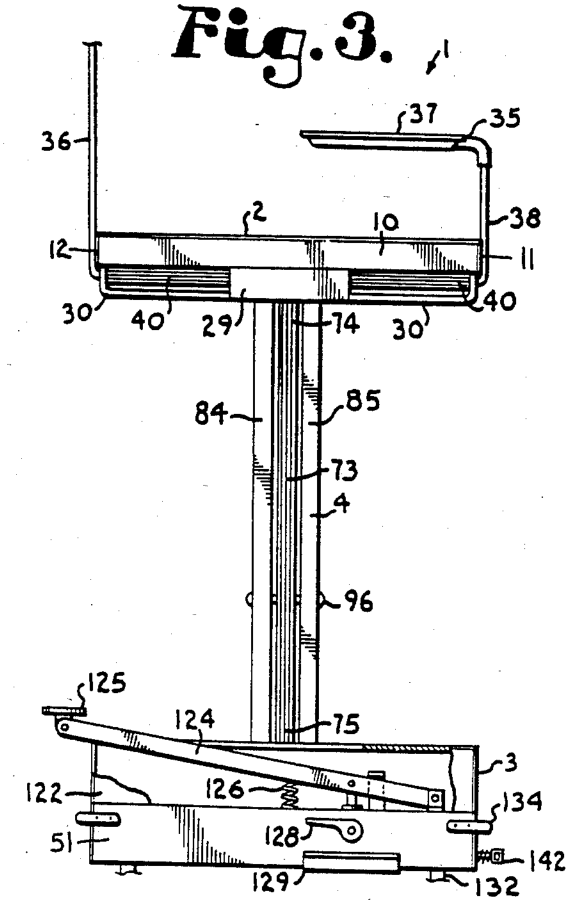
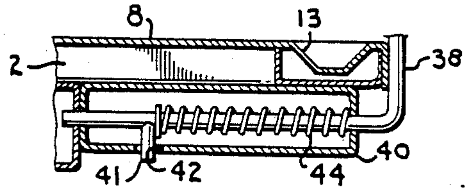
Fig. 14.
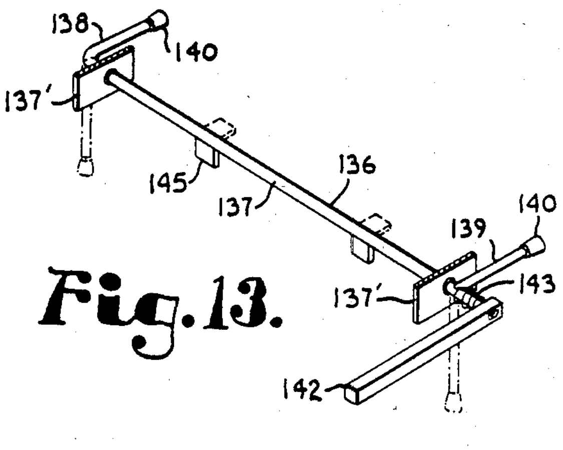
Fig. 13.

Fig. 5.
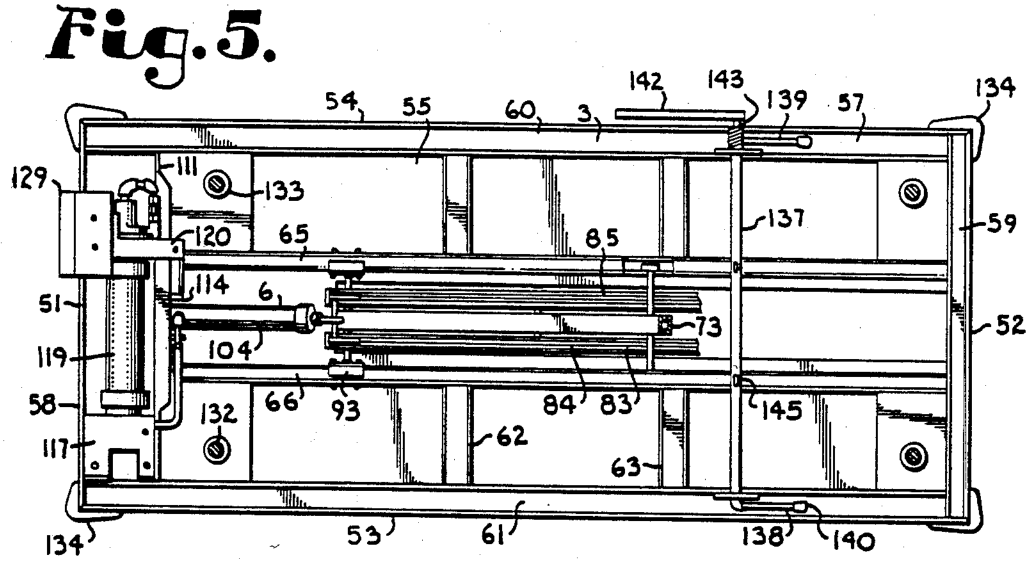
Fig. 6.
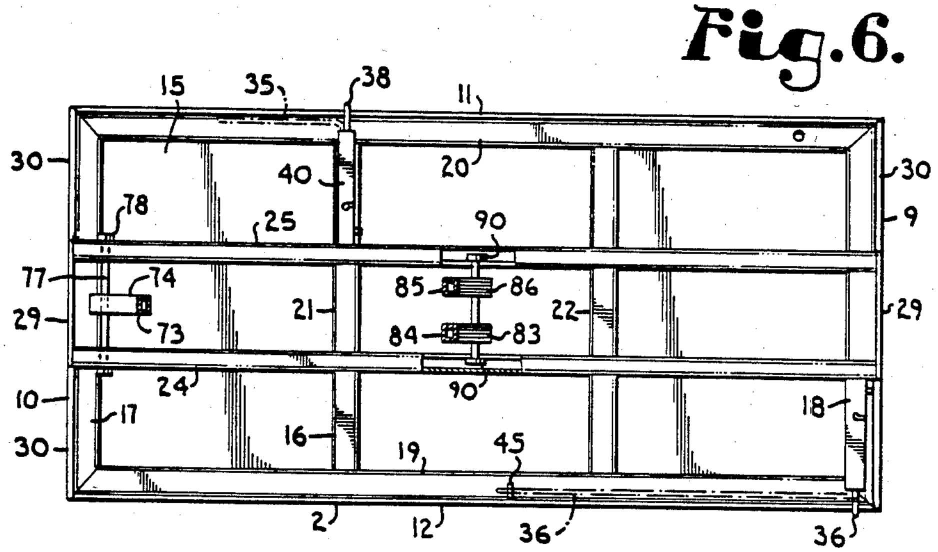
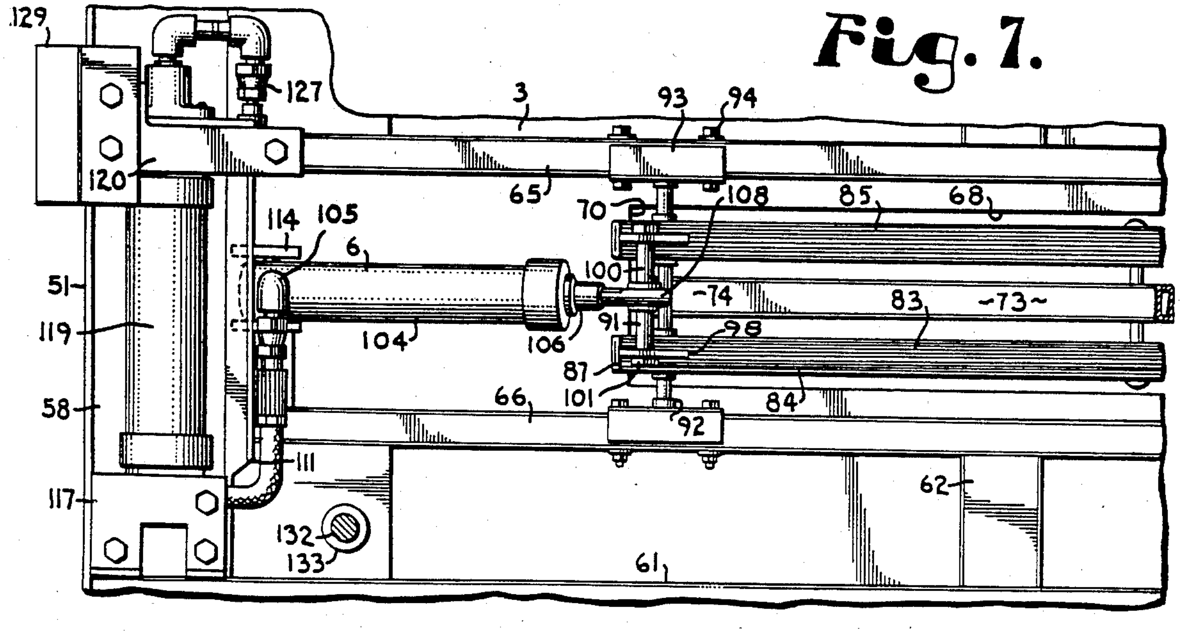
Fig. 7.

PATIENT LIFTING TABLE

This is a continuation-in-part of application Ser. No. 313,086, filed Oct. 20, 1981, now abandoned.

This invention relates to lift tables and particularly to those tables employing a scissor linkage mechanism to vary the distance between an upper platform and a lower platform.

BACKGROUND OF THE INVENTION

Prior art devices for elevating objects, human patients or animals from a lowered position to an elevated position have generally been designed for a single specific purpose and usually are confined to a specific range of adjustment between a lower and an elevated position. For example, in the medical field, a patient stretcher used in ambulances is generally adapted for adjustment between a lowered position in which a patient can be lifted onto the stretcher with minimal lifting or handling and a higher, second position to facilitate transfer to an ambulance. Stretchers are also normally suitable for transporting the patient from the ambulance to a hospital bed. The stretchers have only a small range of height adjustment which usually necessitates lifting the patient from the ground surface onto the stretcher. While the stretcher can be used for transporting the patient, the patient must ultimately be lifted a second or even a third time to transfer the patient to a bed or an operating table which is at a more convenient height for treatment. For patients suffering from broken bones and/or internal injuries, such additional handling for transporation and lifting purposes may create further injuries.

Many machinist's tables employ a scissors linkage mechanism but because enormous weights must sometimes be lifted, these tables are often extremely heavy and complex in construction. Moreover, the complexity of the tables mitigates against medical usage, as it is often difficult to thoroughly clean such tables. Greasy, oily or otherwise unsanitary mechanisms are often exposed between the upper and lower platforms, making the device unsuitable for either hospital or veterinary use.

OBJECTS OF THE INVENTION

In view of the above, the principal objects of the present invention are: to provide a patient lifting table having a full range of height adjustment from a lowered position to an elevated position and including any position therebetween; to provide such a patient lifting table having a downward position situated only a small distance above a floor surface and which facilitates the placement of the patient onto the table; to provide such a patient lifting table in which a downward position is only a few inches above the floor surface; to provide such a patient lifting table in which an upper platform may rest only upon a lower platform for maximum downward travel; to provide such a patient lifting table which is useful for patient transportation and operating; to provide such a patient lifting table having planar, unobstructed surfaces on both upper and lower platforms for ease of cleaning and maintaining sanitary conditions; to provide such a patient lifting table which has a handy, foot operated pump and leaves both of the operator's hands free for working on the patient; to provide such a patient lifting table which is stable and sturdy in use and able to support moderate weights; and to provide such a patient lifting table which is relatively inexpensive, sturdy and efficient in use and particularly well adapted for the intended purpose.

Other objects and advantages of this invention will become apparent from the following description taken in conjunction with the accompanying drawings wherein are set forth, by way of illustration and example, certain embodiments of this invention.

DESCRIPTION OF THE DRAWINGS

FIG. 2 is a side elevational view of the patient lifting table in the elevated position.

FIG. 3 is an end elevational view of the patient lifting table in the elevated position and having portions in fragmentary representation to show inner details.

FIG. 5 is a bottom view of a lower platform of the patient lifting table taken along lines 5—5, FIG. 2.

FIG. 6 is a bottom view of an upper platform of the patient lifting table of taken lines 6—6, FIG. 2.

FIG. 7 is an enlarged, fragmentary view of the underside of the lower platform.

FIG. 13 is a perspective, fragmentary view of a stop device affixed to the table.

FIG. 14 is an enlarged, fragmentary view of an accessory holder.

DESCRIPTION OF THE PREFERRED EMBODIMENT

Figure 1:
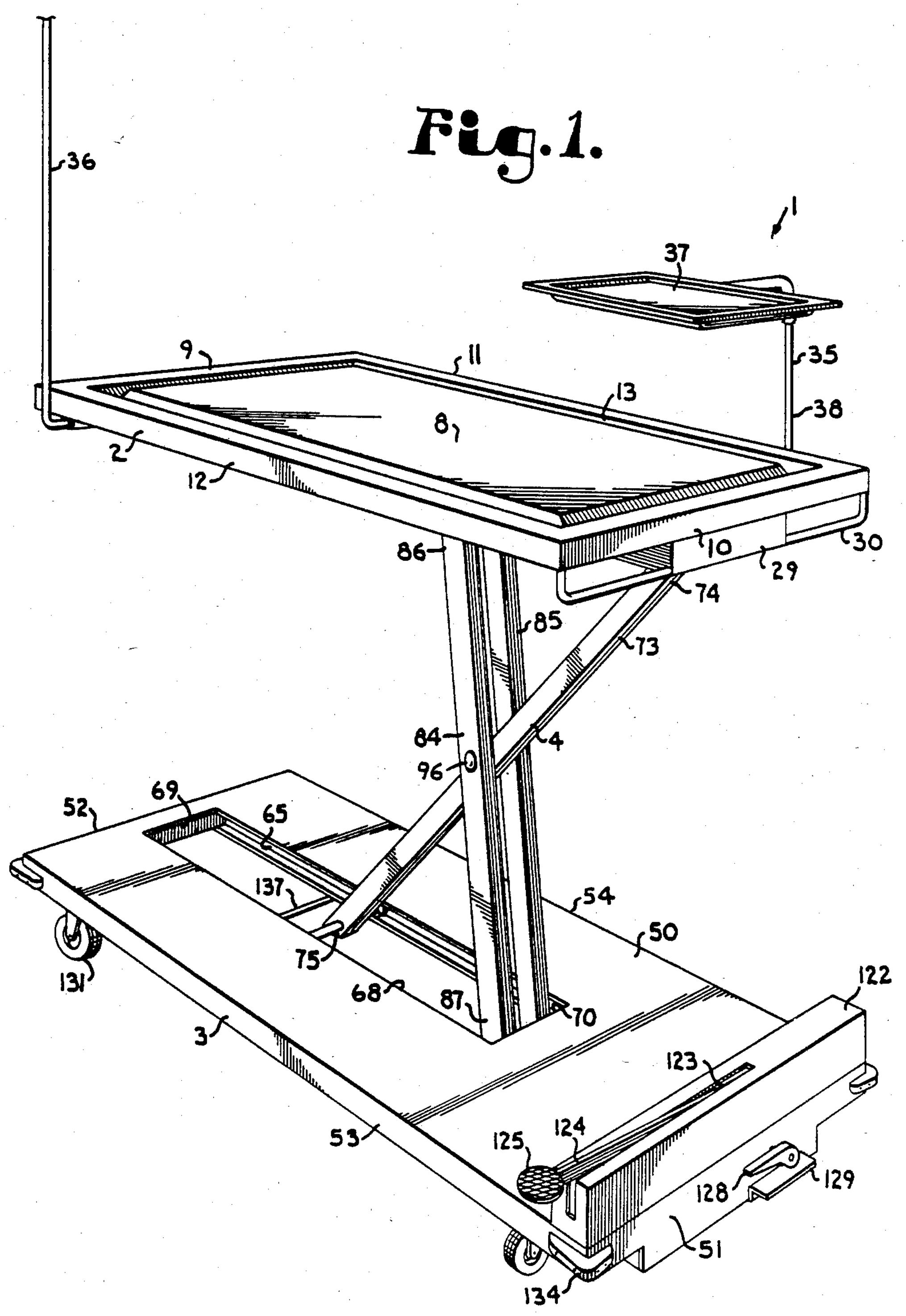
FIG. 1 is a perspective view of the patient lifting table shown in an elevated position.
Figure 4:
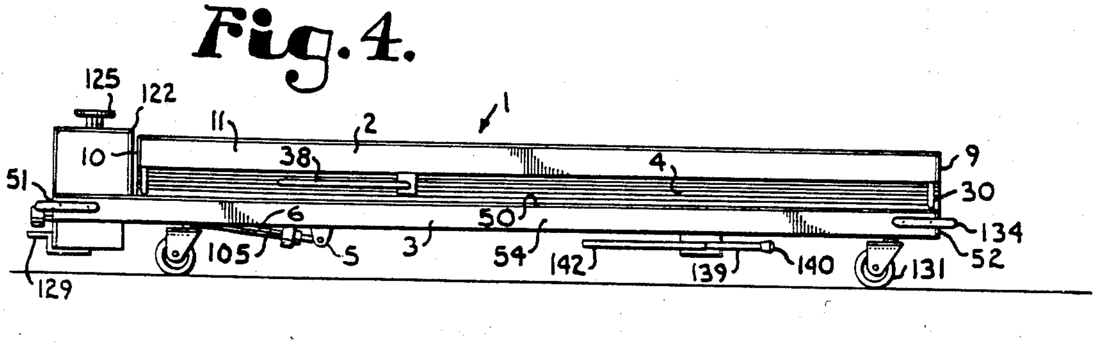
FIG. 4 is a side elevational view of the patient lifting table in a lowered position.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1, FIG. 1 generally indicates a patient lifting table embodying the present invention. The lifting table 1 includes an upper supportive platform 2, a lower platform 3 located below the upper platform 2 for positioning upon a floor surface, and a scissor linkage mechanism 4 extending between and connected to the upper and lower platforms 2 and 3. The lever arm 5 is affixed to and extends from a lower end of one of the scissors mechanism links and a means 6 extends between the lower platform 3 and the lever arm 5 and enables raising and lowering of the upper platform 2 relative to the lower platform 3.

In the illustrated example, the patient lifting table 1 is particularly adapted for human or animal patient use and is predominantly composed of a durable, rust-free material such as stainless steel. The upper platform 2 is generally rectangular and has a substantially planar surface 8, opposite ends 9 and 10, spaced side walls 11 and 12 and peripherally extending groove 13. The groove 13 is for drainage of bodily fluids. An underside 15, FIG. 6, of the upper platform 2 has a supportive framework 16 including opposite end members 17 and 18, side members 19 and 20 and intermediate cross braces 21 and 22 to which the planar surface 8 is attached. Spaced, parallel track members 24 and 25 extend longitudinally along the underside 15 and are intermediately positioned between the side members 19 and 20 and connected to the end members 17 and 18 and the cross braces 21 and 22.

Figure 12:
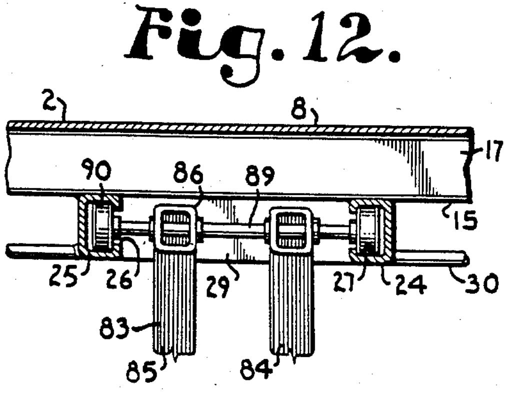
FIG. 12 is a sectional view taken along lines 12—12, FIG. 2.

In the illustrated example, FIG. 12, the track members 24 and 25 are in the form of elongate, C-shaped channels, each having an opening 26 toward the longitudinal center line of the upper platform 2 and an interior way 27. The track members 24 and 25 and ways 27 are utilized in connection with the scissors linkage mechanism 4 as hereinafter described.

At the opposite ends 9 and 10, stiffening plates 29 extend between and are connected to the ends of the track members 24 and 25. Rods forming handrails 30 extend from the stiffening plates 29 to the corners of the upper platform 2 for grasping and movement of the table 1 or for use as patient tie-downs.

Making the lifting table 1 particularly useful for patient or hospital use are accessories such as an instrument tray support 35 and an intravenous drip stand 36. The instrument tray support 35 includes an instrument tray 37 suitably and removably connected to a holder rod 38. The dripstand 36 and holder rod 38 each have an L-shaped lower end which is received in an accessory holder, such as a sleeve 40, FIG. 14, such as of cross-sectionally square configuration. The lower end of the rod 38 extends through the sleeve 40 and has a guide pawl 41 protruding therefrom and received in a generally T-shaped slot 42 of the sleeve 40. A coil spring 44 encircles the end of the holder 38 and biases the rod and pawl 41 into the T-portion of the slot 42 so that the rod 38 remains upright when selectively moved to the upright position. Additionally, a mounting clip 45 secures the rod when the same is moved to a storage position. In use, the instrument tray support 35 and drip stand 36 are rotated into an upright position as desired and swung downwardly when not in use for out-of-the-way storage.

The lower platform 3 is positioned substantially below and aligned with the upper platform 2 and has a generally planar, obstruction free upper surface 50. In the illustrated example, the lower platform 3 and its opposite ends 51 and 52 and opposite side walls 53 and 54 form a rectangular structure. An underside 55 of the lower platform 3, FIG. 5, is similarly configured to the underside 15 of the upper platform 2 and includes a framework 57 of spaced end members 58 and 59, side members 60 and 61 and cross braces 62 and 63. Track members 65 and 66 of the same configuration as that described in connection with the track members 24 and 25 extend between the end members 58 and 59. An elongate inner opening 68 extends longitudinally through lower platform 3 and has one end 69, FIG. 1, terminating at the end member 59 and another opening end 70 terminating substantially equidistantly between the cross brace 62 and the end member 58. Lower portions, described below, of the scissor linkage mechanism 4 extend upwardly through the center opening 68 for ultimate connection with the upper platform 2.

Figure 8:
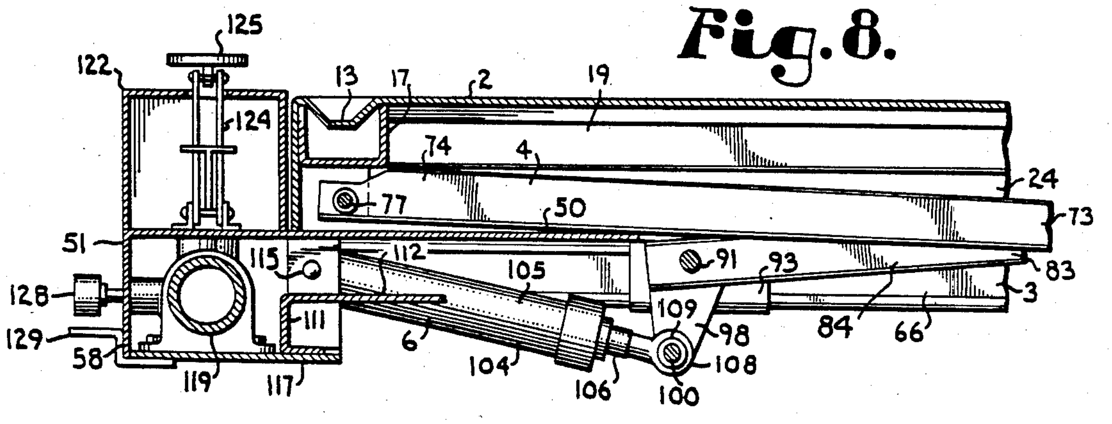
FIG. 8 is a fragmentary, side elevational view of the portion of the lower platform shown in FIG. 7 and depicting the upper platform lowered against the lower platform.
Figure 11:
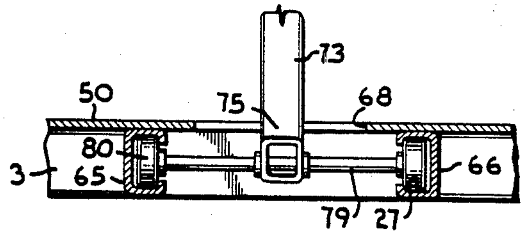
FIG. 11 is a sectional view taken along lines 11—11, FIG. 2.

The scissors linkage mechanism 4 extends between and is connected to the upper and lower platforms 2 and 3 to provide substantially straight upward and downward movement of the upper platform 2 relative to the lower platform 3. In the illustrated example, the scissors linkage mechanism 4 includes generally X-shaped when extended, straight crossing arms or legs, such as a center link arm or member 73 having an upper end 74 and a lower end 75, FIGS. 2 and 3. The upper end 74 includes a rod or shaft 77, FIG. 6, extending therethrough and having opposite ends 78 extending through the spaced upper track member 24 and 25 and affixed thereto as by fasteners adjacent the end member 17. The upper end 74 is notched, FIG. 8, for clearance upon swinging of the center leg members 73 relative to the upper platform 2, as when unfolding. The lower end 75 of the center link member arm 73, FIG. 11, similarly has an axle or rod extending therethrough but instead has means facilitating sliding of the lower end 75 relative to the lower platform 3. In the illustrated example, wheels or rollers 80 are rotatably mounted to the ends of the axle or rod 79 and are fitted within the ways 27 of the track members 65 and 66 so that the lower end 75 slides respectively forwardly and rearwardly upon lowering and raising.

Figure 10:
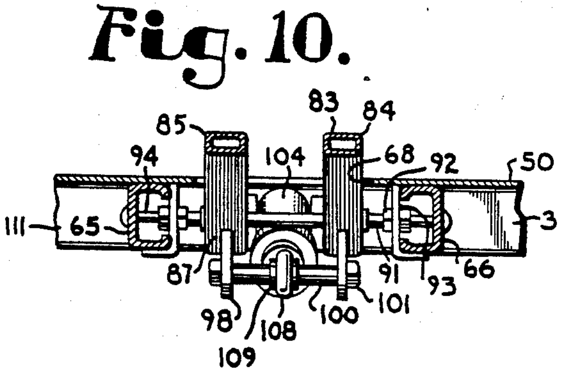
FIG. 10 is a sectional view taken along lines 10—10, FIG. 9.

Second or crossing link members 83 include in the illustrated example, FIG. 1, a pair of links 84 and 85. The links 84 and 85 respectively have upper and lower ends 86 and 87 with the upper ends 86, FIG. 12, having an axle or rod 89 extending transversely therethrough and having wheels or rollers 90 rotatably mounted on the axle ends. The wheels or rollers 90 are received in the ways 27 of the upper track members 24 and 25 whereby the upper ends 86 of the link members 84 and 85 roll or slide longitudinally in the track members 24 and 25 upon raising and lowering the upper platform 2 relative to the lower platform 3. The lower ends 87, FIG. 10, of the link members 84 and 85 are swingably affixed to the framework 57 of the lower platform 3 and in the illustrated example, an axle or rod 91 extends transversely through the lower ends 87 and its opposite end portions are received in journals 92 securely mounted to connecting plates 93. The plates 93 are in turn rigidly affixed to the track members 65 and 66 as by bolts 94, thereby swingably affixing the lower ends 87 of the link members 84 and 85 to the lower platform framework 57. To maintain the link members 84 and 85 and the center link member 73 in generally X-shaped or crossing relationship, mid portions of the respective members 73, 84 and 85 are interconnected by a transverse axle or rod 96, FIG. 1, whereby upon movement of the upper platform 2 toward and away from the lower platform 3, the center link member 73 tends to swing or pivot relative to the link member 84 and 85.

Figure 9:
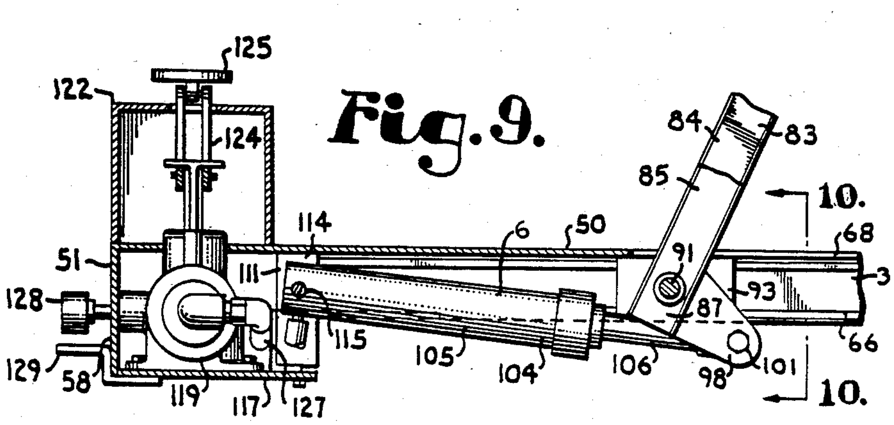
FIG. 9 is a fragmentary, side elevational view of the lower platform and showing a scissors mechanism in an expanded position.

Respective lever arms are affixed to and extend from the lower ends 87 of the link members 84 and 85 and connect to the means 6 extending between the lower platform 3 and the lever arm. In the illustrated example, the means 6 is extensible and retractable to cause raising and lowering of the upper platform 2 relative to the lower platform 3. In the illustrated example, an ear-shaped lever arm or bell crank, FIGS. 9 and 10, extends upwardly of each of the lower ends 87 and protrudes toward the platform 72. The bell crank 98 is of precise dimensions so as to achieve a specified throw or rotative angle of the link members 84 and 85 for full extension and retraction of the upper platform 2 relative to the lower platform 3. A connecting shaft 100 extends between outer portions of the bell cranks 98 and its opposite ends are secured thereto as by nuts 101, FIG. 9. Preferably, the connecting shaft 100 is positioned below the level of the axle or shaft 91 throughout its full range of travel, FIGS. 8 and 9.

The means 6, in the illustrated example, includes a single action power fluid ram 104 having a cylinder 105 and a piston 106. Both ends of the ram 104 are swingably mounted, respectively to the lower platform framework 57 and to the connecting shaft 100 and in the illustrated example FIG. 8, the piston 106 includes an end eye 108 holding a bushing 109 through which the connecting shaft 100 extends. Accordingly, the cylinder end 105 of the ram 104 is pivotally connected to the framework 57. In the illustrated example FIGS. 7 and 8, a support for the cylinder end 105 is formed of a sturdy cross brace 111 extending between and connected to the side members 60 and 61 and has out turned flanges 112 for strength. Spaced ears 114 are positioned on opposite sides of the end of the cylinder end 105 and a pin 115, FIGS. 8 and 9, extends through the ears 114 and the end 105 of the ram 104 to rotatably secure the same to the framework 57. Sufficient sturdiness of the cross brace 111 and flanges 112 is required, as the ram 104 must push hard against the cross brace 111 while exerting force against the bell cranks 98 to raise the scissors linkage mechanism 4.

A pump means is associated with the ram 104 to supply pressurized fluid. In the illustrated example FIG. 7, a pump bracket 117 is mounted between the cross brace 111 and the end member 58 to provide support at one corner of the lower platform 3 for an end of a manual pump 119. The pump 119 is of conventional configuration and is further mounted at a front bracket 120 so that the pump is securely mounted adjacent the end 51 of the lower platform 3. The pump 119 projects above the upper surface 50 of the lower platform 3 and is protected by a suitable cover or guard 122, such as of rectangular configuration, FIG. 1, which is attached to the lower platform adjacent the end 51. A slot 123 extends a portion of the cover 122 and provides for extension of a pump lever 124 having an end pad 125 suitable for foot operation and a return spring 126.

Suitable conduit or tubing 127 connects the outlet of the pump 119 with the ram 104 for carrying pressurized hydraulic fluid from the pump 119. The pump 119 contains an internal one-way check or relief valve (not shown) which is actuated by a valve lever 128, FIGS. 8 and 9. A stop 129 in the form of a plate or bracket is mounted immediately below the valve lever 128 so that excessive foot pressure on the lever does not over stress the internal valve parts.

For movement about a floor surface, casters or wheels 131 are mounted on rotatable shafts 132 and are pivotally affixed in sockets 133 mounted at the four corners of the lower platform 123. Bumpers 134 are also located at the corners for protection during movement.

A stop 136, FIG. 13, is provided to prevent undesired movement of the lifting table 1 about the floor, as when performing operations or leaving the table unattended. In the illustrated example, the stop 136 is of the kick stand nature and comprises an elongate rod 137 extending between journals in brackets 137' depending from the opposite side walls 53 and 54. Short shafts forming feet 138 and 139 each have a rubber tipped cap 140 and when the rod 137 is rotated, engage the floor. A foot operated lever 142 is positioned outwardly of the side member 54 and is spring loaded to a retracted position by a coil spring 143 sleeved about the end of the rod 137 and having its opposite ends respectively mounted to the bracket 137' and the lever 142. To maintain rigidity of the rod 137, L-shaped brackets 145 are secured to the framework 57 at appropriate locations. The feet 138 and 139 are longer than the combined length of the casters or wheels 131 and shafts 132 so that when foot pressure is applied to the stop lever 142, the feet 138 and 139 rotate into ground engagement and lift the table 1 upwardly a slight amount to remove weight from the adjacent casters or wheels 131. This prevents free rolling movement. To release the operation of the stop 132, the foot lever 142 is simply rotated in the opposite direction so that the feet 138 and 139 are removed from ground contact and the adjacent casters or wheels 131 return to engagement with the floor.

In the use of the present invention, a full range of heights of the upper platform 2 relative to the floor surface can be achieved from a range of about 39 inches, which is the average operating table height, to as low as possible. For example, for use in the veterinary field, the average cage base height is located 8 to 9 inches above the floor and in an embodiment made according to the present invention, the upper platform 2 is 9½ inches above the floor in the collapsed position. The scissors linkage mechanism 4 permits the upper platform to rest horizontally upon the lower platform 3 just a very short distance above the floor surface. Thus, a comatose patient need only be lifted a very short distance from the floor onto the upper platform 2, which persons of average strength are readily capable of performing.

For use, a doctor or medical technician merely places the patient on the upper platform and then, placing his foot upon the pump lever 124, pumps up the upper platform 2 to the desired height. Extension of the ram 104 causes the piston end eye 108 to urge the shaft outwardly and push against the bell cranks 98, thus causing the bell cranks 98 to swing about the axle or rod 91. The link members 84 and 85 swing upwardly with the upper ends 86 sliding. The scissors linkage mechanism 4 provides both longitudinal and lateral stability to the upper platform 2 relative to the lower platform 3. To return the upper platform 2 to the lower position, the technician merely depresses the valve lever 128 and the weight of the platform 2 causes it to slowly lower.

It is to be understood that while certain forms of the present invention have been illustrated and described herein, it is not to be limited to the specific forms or arrangement of parts described and shown.

What is claimed and desired to be secured by Letters Patent is as follows:

1. A veterinary table comprising:

(a) an upper platform having a planar, patient supportive upper surface and an underside including track means;

(b) a lower platform positioned below and aligned with said upper platform and having a generally planar, obstruction free upper surface for said upper platform to rest upon and an underside;

(c) wheels mounted to said lower platform for movement over a floor surface;

(d) a track means mounted in said lower platform underside;

(e) a scissor linkage mechanism extending between and connected to said upper and lower platforms to provide straight upward and downward movement of said upper platform relative to said lower platform; said scissor linkage mechanism including a center link member having an upper end pivotally affixed to said upper platform underside and a lower end slidable in said lower platform track means, and spaced link members with said center link member extending therebetween; said spaced link members having upper ends slidable in said upper platform track means and lower ends pivotally affixed to said lower platform underside; said center link member and said spaced link members having pivotally interconnected mid-portions;

(f) said lower ends of said spaced link members being mounted below said lower platform upper surface and having bell crank arms extending angularly therefrom and supporting a rod extending transversely between said bell crank arms;

(g) a power fluid ram mounted in said lower platform and aligned with said lower platform track means, said ram having one end pivotally connected to said lower platform and a second end pivotally connected to said rod, said rod being extensible and retractible to cause upward and downward swinging of said spaced link members and raising and lowering of said upper platform; said ram being mounted entirely below said lower platform upper surface for concealment and whereby said upper platform may rest against said lower platform; and (h) a manual pump and relief valve mounted on said lower platform adjacent said ram.

2. The veterinary lift table set forth in claim 1 including:

(a) a stop secured to said lower platform and having lever means therewith operable to remove weight from some of said wheels to stop movement over said floor surface.

3. A veterinary lift table comprising:

(a) a rectangular, patient supportive upper platform having a substantially planar upper surface, opposite ends and an underside frame having spaced, longitudinal channels forming tracks;

(b) a rectangular lower platform of substantially equal dimensions to said upper platform and having a generally planar, obstruction free upper surface, opposite ends and an underside frame having spaced longitudinal channels forming tracks;

(c) wheels mounted on said lower platform for movement over a ground surface;

(d) stop means mounted on said lower platform and engageable with said ground surface for selectively inhibiting movement;

(e) a scissor linkage mechanism extending between and connected to said upper and lower platforms to provide straight upward and downward movement of said upper platform relative to said lower platform; said scissor linkage mechanisms including a center link arm having an upper end pivotally affixed to said upper platform frame and a lower end having wheels rotatably connected thereto and received in said lower platform tracks; and spaced link arms having upper ends with wheels rotatably connected thereto and received in said upper platform tracks and lower ends pivotally affixed to said lower platform frame; said center link arm and said spaced link arms crossing and having pivotally interconnected mid-portions;

(f) bell crank arms connected to and extending angularly from said spaced link arms lower ends, said bell crank arms having a rod extending therebetween and positioned below said spaced link rams lower ends;

(g) an extensible and retractible power fluid ram positioned in said lower platform below and concealed by the surface thereof and having one end pivotally affixed to said frame and a second end pivotally affixed to said rod for swinging said spaced link arms upwardly and downwardly upon respective extension and retraction of said ram; and (h) a foot operated pump mounted on said lower platform at one end of said lower platform adjacent said ram and having a cover concealing said pump;

(i) a relief valve mounted at said one end of said lower platform and having a foot operable lever thereon to release pressure in said ram and facilitate lowering of said upper platform against said lower platform.

4. A veterinary table comprising:

(a) an upper platform having a planar, patient supportive, upper surface;

(b) a lower platform positioned below and aligned with said upper platform and having a generally planar, obstruction free, upper surface, for said upper platform to rest upon;

(c) a scissors linkage mechanism extending between and connected to said upper and lower platforms to provide straight upward and downward movement of said upper platform relative to said lower platform; said scissors linkage mechanism including a center link member having an upper end pivotally affixed to said upper platform and a lower end slidably mounted on said lower platform, and spaced link members with said center link member extending therebetween; said spaced link members having upper ends slidably mounted on said upper platform and lower ends pivotally affixed to said lower platform; one of said spaced link members having a lower end with a lever arm affixed thereto and extending therefrom;

(d) actuation means engaging said scissors linkage mechanism and operable to vary an extension of same and to cause selected raising and lowering of said upper platform relative to said lower platform;

(i) said actuation means including a power fluid ram pivotally connected to, and extending between, said lower platform and said lever arm and extensible and retractable to selectively cause said raising and lowering of said upper platform with respect to said lower platform.

5. The table as set forth in claim 4 wherein:

(a) said lower platform has a frame and an underside; said lower platform having first and second end positions;

(b) said ram has one end pivotally connected to said lower platform frame at said first end; and (c) said ram is positioned entirely below said upper surface.

6. The lifting table set forth in claim 5 wherein:

(a) said lower platform has opposite ends, spaced sides, and a generally planar surface;

(b) an elongate opening extends through said lower platform; and, said scissors linkage mechanism has lower end portions extending through said opening;

(c) said ram is mounted at one of said ends of said lower platform and extends under said planar surface;

(d) said actuation means includes a pump mounted at said one of said ends of said lower platform;

(e) said pump includes a pump lever extending above said planar surface of said lower platform; and (f) said pump lever has a pad thereon for foot actuation for raising of said upper platform.

* * * * *